US008294778B2

United States Patent
Okutomi et al.

(10) Patent No.: US 8,294,778 B2
(45) Date of Patent: Oct. 23, 2012

(54) IMAGE PROCESSOR, IMAGE ACQUISITION APPARATUS, AND STORAGE MEDIUM OF IMAGE PROCESSING PROGRAM

(75) Inventors: Masatoshi Okutomi, Tokyo (JP); Masao Shimizu, Tokyo (JP); Takahiro Yano, Akishima (JP)

(73) Assignees: Tokyo Institute of Technology, Tokyo (JP); Olympus Corporation, Tokyo (JP)

( * ) Notice: Subject to any disclaimer, the term of this patent is extended or adjusted under 35 U.S.C. 154(b) by 882 days.

(21) Appl. No.: 12/323,698

(22) Filed: Nov. 26, 2008

(65) Prior Publication Data

US 2009/0167885 A1 Jul. 2, 2009

(30) Foreign Application Priority Data

Nov. 28, 2007 (JP) ................................ 2007-307903

(51) Int. Cl.
*H04N 5/228* (2006.01)
*H04N 5/232* (2006.01)
*G03B 13/00* (2006.01)
*G06K 9/62* (2006.01)
*G06K 9/64* (2006.01)

(52) U.S. Cl. ..................... 348/222.1; 348/345; 382/209; 382/278

(58) Field of Classification Search .................. 382/255, 382/260, 263, 276, 280; 348/222.1
See application file for complete search history.

(56) References Cited

U.S. PATENT DOCUMENTS

| 5,619,596 | A  | * | 4/1997 | Iwaki et al. ................... 382/278 |
| 2007/0019104 | A1 | * | 1/2007 | Inoue et al. ................... 348/345 |
| 2009/0208115 | A1 | * | 8/2009 | Abe ............................. 382/209 |

FOREIGN PATENT DOCUMENTS

JP  7-135597 A  5/1995
JP  2006-329897 A  12/2006

* cited by examiner

*Primary Examiner* — Jason Chan
*Assistant Examiner* — Pritham Prabhakher
(74) *Attorney, Agent, or Firm* — Holtz, Holtz, Goodman & Chick, PC

(57) ABSTRACT

An image processor includes a frequency transformation unit configured to perform frequency transformation processing with respect to a multiple image, and an inter-superimposed-image displacement acquisition unit that calculates a displacement amount between images forming superimposed images included in the multiple image by using a frequency-transformed image subjected to the frequency transformation processing by the frequency transformation unit.

41 Claims, 8 Drawing Sheets

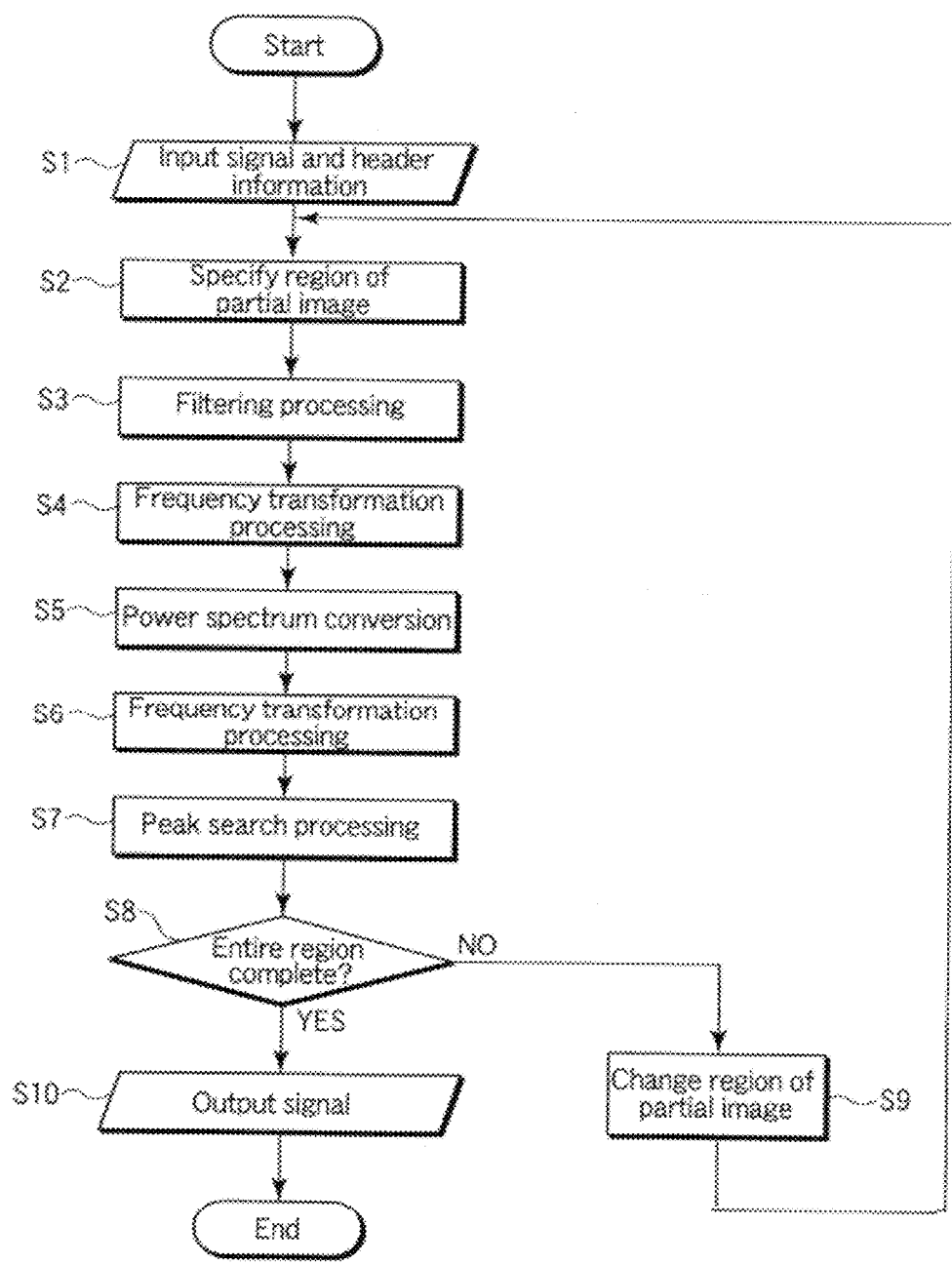
F I G. 10

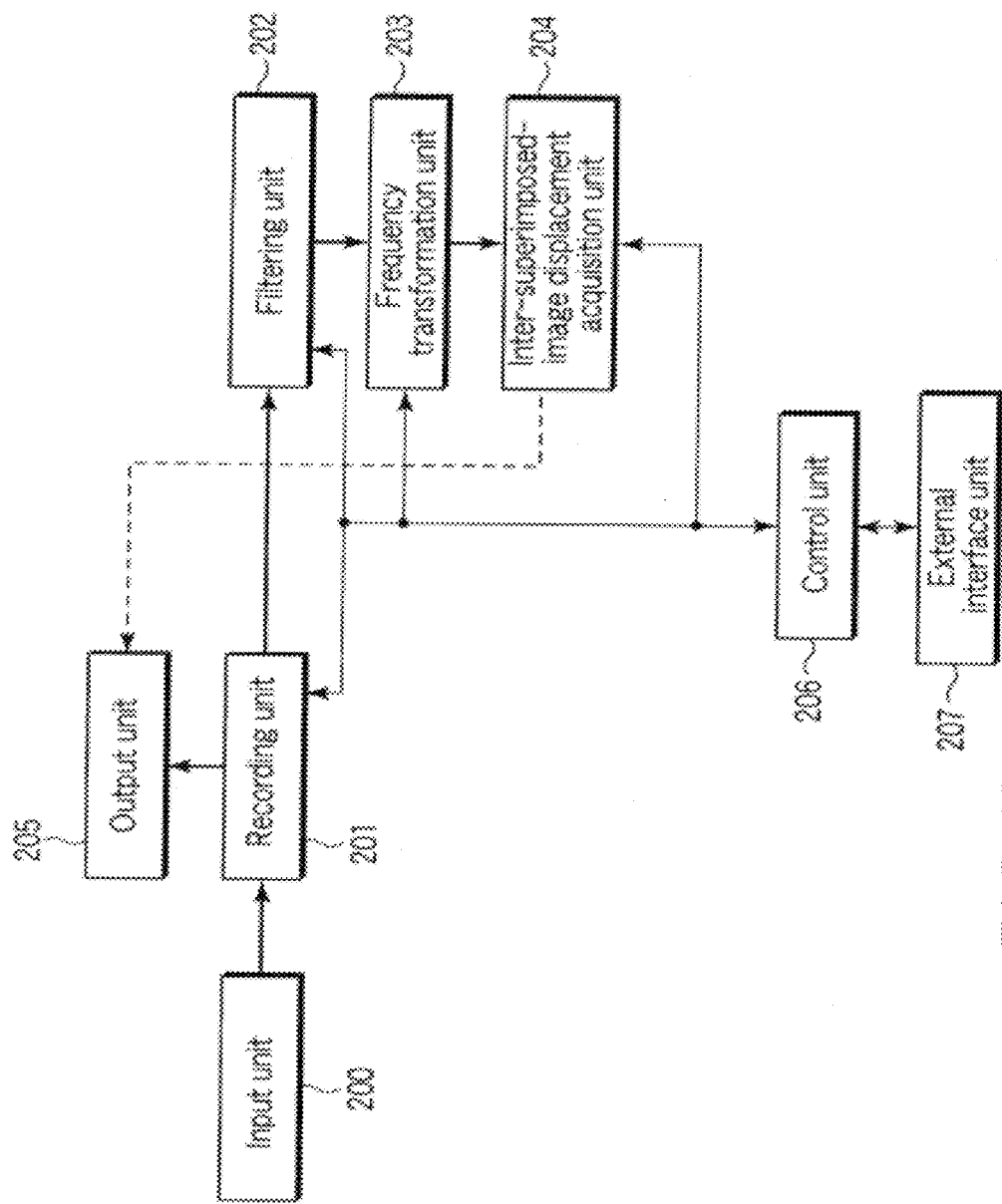
F I G. 12

IMAGE PROCESSOR, IMAGE ACQUISITION APPARATUS, AND STORAGE MEDIUM OF IMAGE PROCESSING PROGRAM

CROSS-REFERENCE TO RELATED APPLICATIONS

This application is based upon and claims the benefit of priority from prior Japanese Patent Application No. 2007-307903, filed Nov. 28, 2007, the entire contents of which are incorporated herein by reference.

BACKGROUND OF THE INVENTION

1. Field of the Invention

The present invention relates to an image processor that acquires displacement of superimposed images in a multiple image in which acquired images of a subject are superimposed on each other, an image acquisition apparatus including this image processor, and a storage medium storing an image processing program allowing a computer to function as such an image processor.

It should be noted that a "multiple image" in this specification represents general images in which images of a subject are superimposed on each other. Specifically, it represents: an image acquired when an image acquisition apparatus forms images of a subject in a superimposed manner; a ghost image in which images of a subject are superimposed because of an electronic or an optical function; a flare image; an image in which images of a subject are multiply-layered because of a failure in positioning processing when a plurality of images are positioned and superimposed on each other; and others. Further, "multiple" means a state where images are at least partially superimposed on each other.

2. Description of the Related Art

There is proposed a technology that includes a mechanism that acquires images of a subject in a superimposed manner in an image acquiring apparatus such as a camera, acquires images of the subject in the form of a multiple image, and measures displacement between superimposed images in the multiple image to measure a distance to the subject when acquiring the image by the image acquisition apparatus. For example, Jpn. Pat. Appln. KOKAI Publication No. 2006-329897 discloses a technique that uses a double image reflected on a transparent plate to measure a distance. Jpn. Pat. Appln. KOKAI Publication No. 7-135597 discloses a technique that acquires a double image by utilizing a diaphragm having a plurality of apertures to acquire a double image to measure a distance.

According to both inter-image displacement amount measuring methods in the above-explained two technologies, an auto-correlation function is calculated, and a second peak is sought to measure an inter-image displacement amount.

An example of a calculating formula for an auto-correlation function is as follows:

$$y_2(i) = y_1(i+\tau)$$

$$R(\tau) = \frac{\sum_{i \in \Omega} (y_1(i) - \overline{y}_1)\,(y_2(i) - \overline{y}_2)}{\sqrt{\sum_{i \in \Omega} (y_1(i) - \overline{y}_1)^2 \sum_{i \in \Omega} (y_2(i) - \overline{y}_2)^2}}$$

wherein, each of $y_1$ and $y_2$ is each image of the superimposed images displaced by an amount $\tau$, i is an image coordinate, $\Omega$ is a calculation range, and each of $\overline{y}_1$ and $\overline{y}_2$ is an average value in the calculation range for $y_1$ or $y_2$.

FIG. 1 shows an example of an auto-correlation function.

After calculating such an auto-correlation function, a displacement mount between superimposed images is calculated by detecting a second peak representing a correlation value between superimposed images.

It should be noted that the auto-correlation function is calculated in a one-dimensional space here. For example, when a direction of displacement between images in a multiple image is already known, a displacement amount between the images can be sought based on one-dimensional search along a direction of the displacement between the images. A direction of displacement between images can be obtained in advance by an optical calibration technique if such a structure that a double image reflected on a transparent plate is acquired as disclosed in Jpn. Pat. Appln. KOKAI Publication No. 2006-329897 is adopted, and hence this structure is utilized. When a direction of displacement between images in a multiple image is unknown, searching for an auto-correlation function value in two-dimensional space and detecting a second peak can suffice.

BRIEF SUMMARY OF THE INVENTION

According to a first aspect of the present invention, there is provided an image processor comprising:

an image input unit configured to input a multiple image including superimposed images in which images of a subject are superimposed on each other;

a frequency transformation unit configured to perform frequency transformation processing with respect to the input multiple image; and an inter-superimposed-image displacement calculation unit configured to calculate a displacement amount between images forming the superimposed images included in the input multiple image by using a frequency-transformed image subjected to the frequency transformation processing.

According to a second aspect of the present invention, there is provided an image acquisition apparatus comprising:

an image acquisition optical system configured to form an image of a luminous flux of a subject;

a multiple image formation unit configured to form a multiple image of the subject in the image acquisition optical system;

an image signal generation unit configured to convert light from the image acquisition optical system into an electrical signal and generate an image signal from the converted electrical signal;

a frequency transformation unit configured to perform frequency transformation processing with respect to a multiple image which is generated by the image acquisition optical system, the multiple image formation unit and the image signal generation unit and includes superimposed images in which at least two images are superimposed on each other; and an inter-superimposed-image displacement calculation unit configured to calculate a displacement amount between images forming the superimposed images included in the input multiple image by using a frequency-transformed image subjected to the frequency transformation processing.

According to a third aspect of the present invention, there is provided a storage medium storing an image processing program allowing a computer to execute the steps of:

inputting a multiple image including superimposed images in which images of a subject are superimposed on each other;

performing frequency transformation processing with respect to the input multiple image; and calculating a displacement amount between images forming the superimposed images included in the input multiple image by using a frequency-transformed image subjected to the frequency transformation processing.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a view showing a flowchart for explaining a method of performing measurement processing for a displacement amount between images with a multiple image being divided into partial images when the structure depicted in FIG. 8 is used;

FIG. 12 is a view showing a structure of an image processor according to a second embodiment of the present invention.

DETAILED DESCRIPTION OF THE INVENTION

The best mode for carrying out the present invention will now be explained hereinafter with reference to the accompanying drawings.

First Embodiment

Figure 1:
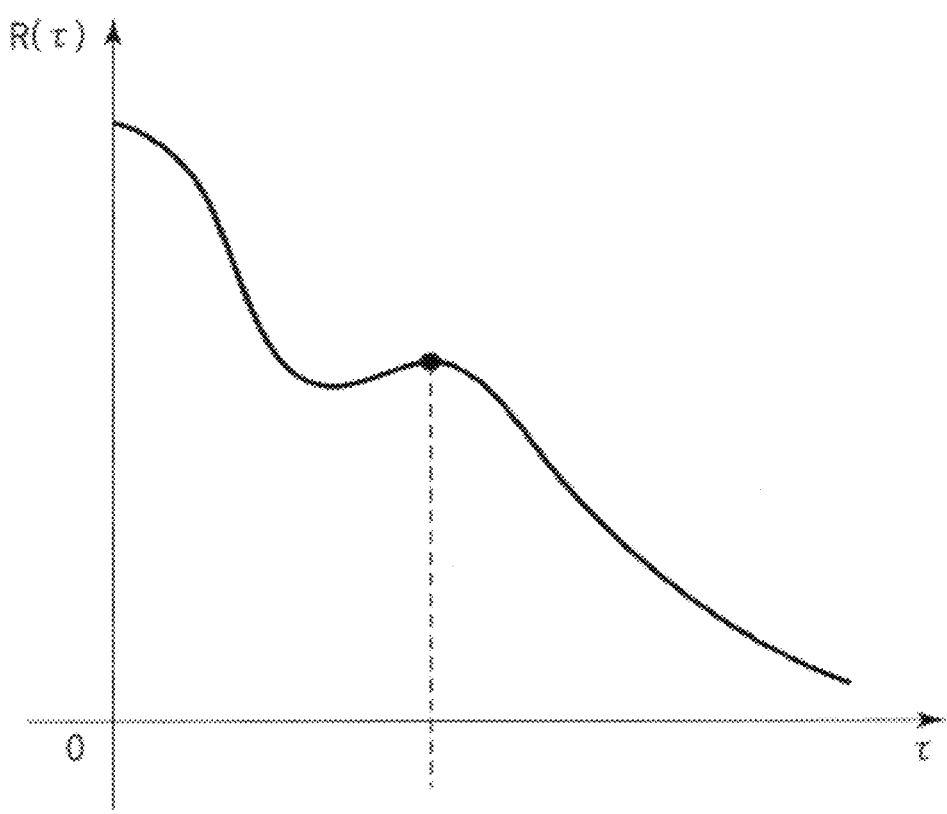
FIG. 1 is a view showing an example of an auto-correlation function.
Figure 2:
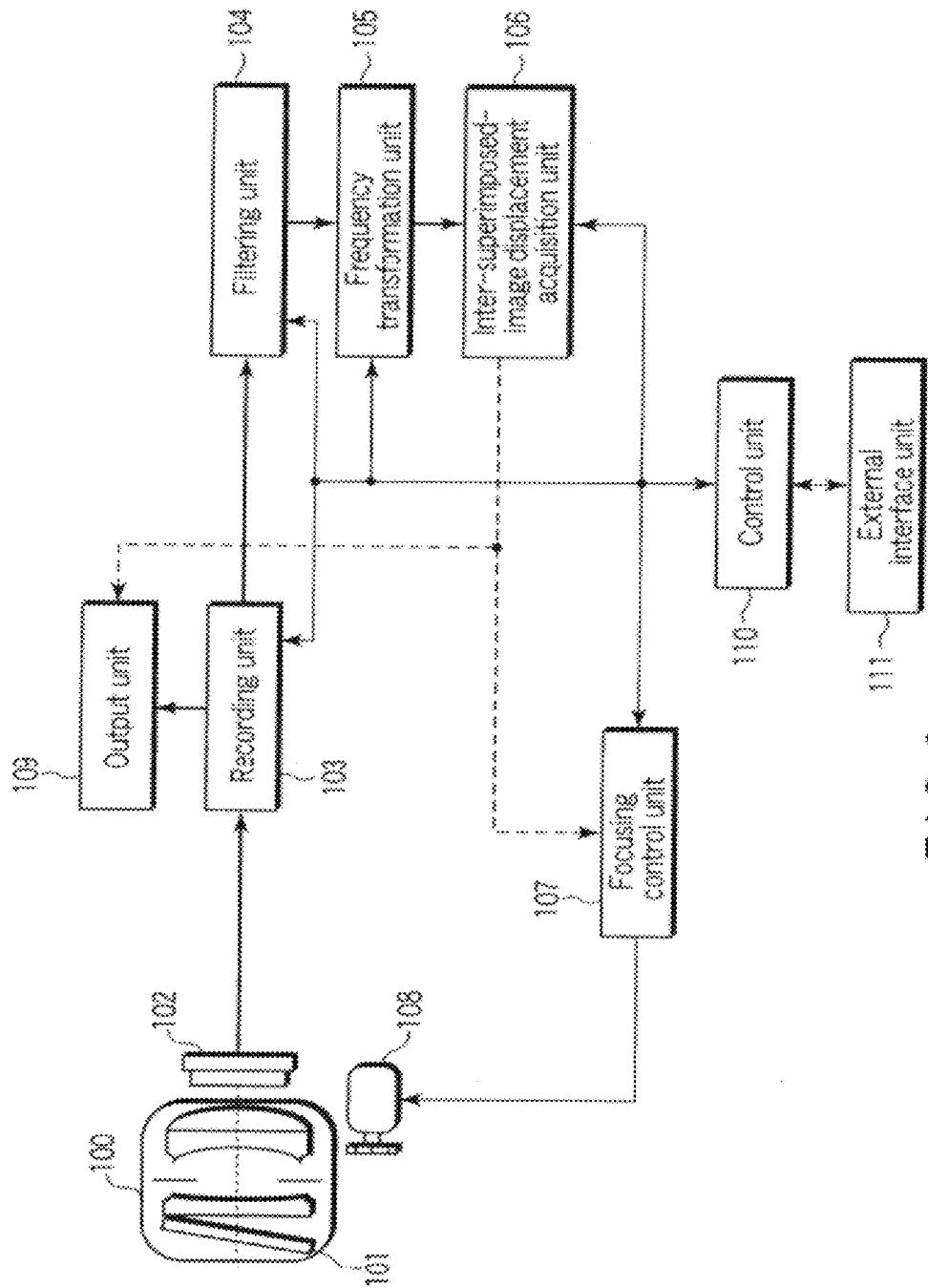
FIG. 2 is a view showing a structure of an image acquisition apparatus according to a first embodiment of the present invention.

As shown in FIG. 2, an image acquisition apparatus according to a first embodiment of the present invention includes: an image acquisition optical system 100 including a multiple image formation unit 101; an image acquisition unit 102; a recording unit 103; a filtering unit 104; a frequency transformation unit 105; an inter-superimposed-image displacement acquisition unit 106; a focusing control unit 107; an AF motor 108; an output unit 109; a control unit 110; and an external interface unit 111. It should be noted that an arrow of a solid thick line represents a flow of a picture signal, an arrow of a solid thin line represents a flow of a control signal, and an arrow of a broken line represents a flow of any other signal in FIG. 2.

The image acquisition optical system 100 forms an image of a luminous flux of a subject. The multiple image formation unit 101 forms a multiple image of the subject in the image acquisition optical system 100. As an actual structure of the multiple image formation unit 101 at this time, a structure that acquires a double image reflected on a transparent plate as explained in, e.g., Jpn. Pat. Appln. KOKAI Publication No. 2006-329897 may be adopted. The image acquisition unit 102 converts light from the image acquisition optical system 100 into an electrical signal and generates an image signal from the converted electrical signal. The image acquisition optical system 100, the multiple image formation unit 101, and the image acquisition unit 102 generate a multiple image having at least two images in a superimposed manner. The recording unit 103 records this generated multiple image.

The filtering unit 104 performs filtering processing with respect to the multiple image recorded in the recording unit 103. The frequency transformation unit 105 carries out frequency transformation with respect to the multiple image subjected to the filtering processing in the filtering unit 104. In this specification, an image subjected to such frequency transformation is called a "frequency-transformed image". The inter-superimposed-image displacement acquisition unit 106 calculates a displacement amount between images forming superimposed images included in the multiple image recorded in the recording unit 103 by using the frequency-transformed image subjected to the frequency transformation in the frequency transformation unit 105.

The focusing control unit 107 specifies a subject distance from an image acquiring position to a subject based on a displacement amount between images calculated in the inter-superimposed-image displacement acquisition unit 106, and controls the AF motor 108 so that the image acquisition optical system 100 can focus on the subject.

The output unit 109 outputs an image recorded in the recording unit 103 and the displacement amount between images calculated by the inter-superimposed-image displacement acquisition unit 106.

The control unit 110 controls the recording unit 103, the filtering unit 104, the frequency transformation unit 105, the inter-superimposed-image displacement acquisition unit 106, and the focusing control unit 107 in response to an instruction from the external interface unit 111. The external interface unit 111 is a user interface, e.g., an input member such as a release switch, various buttons and switches, and a display member such as an LED.

Operations of the respective units in such a structure will be explained hereinafter.

The multiple image formation unit 101 included in the image acquisition optical system 100 optically forms images of the subject in a multiple manner. The images of the subject formed in the multiple manner by this multiple image formation unit 101 are acquired by the image acquisition unit 102 and converted into an electrical signal, thereby generating an image signal of a multiple image.

The multiple image acquired by this image acquisition unit 102 is recorded in the recording unit 103.

Thereafter, measurement processing for a displacement amount between images forming superimposed images included in the multiple image recorded in the recording unit 103 is carried out.

Figure 3:
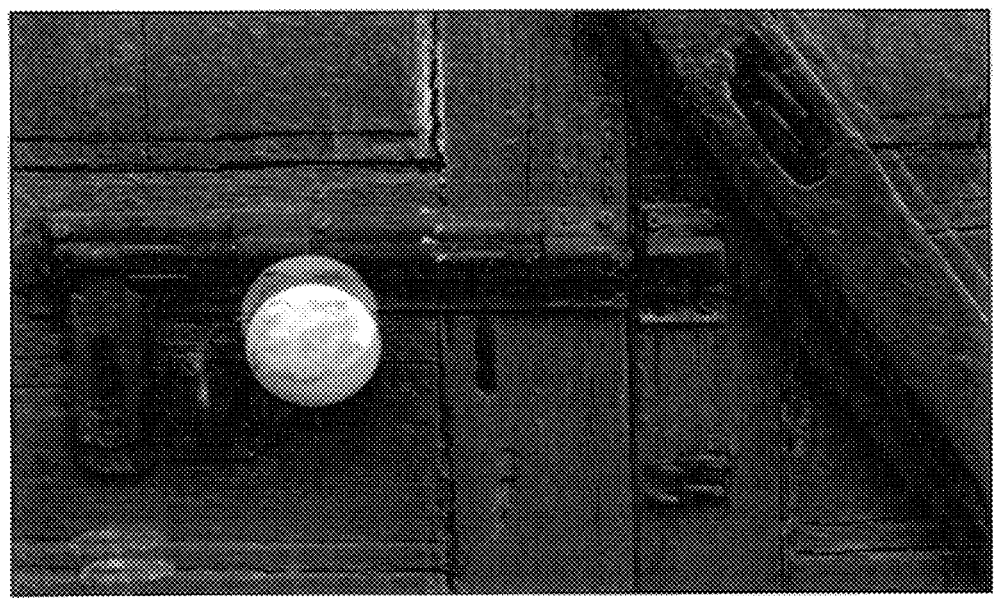
FIG. 3 is a view showing an example of a double image.

Here, to aid understanding the present invention, the principle of restoration processing in inter-image displacement amount measurement will be first explained. The number of superimposed images included in a multiple image is restricted to two to be explained here. That is, the multiple image is such a double image as shown in FIG. 3. However, even if a multiple image includes three or more superimposed images, displacement between the superimposed images can be readily measured based on the following extended principle explanation.

An image generation model of a multiple image acquired by the image acquisition optical system 100 (multiple image formation unit 101) and the image acquisition unit 102 is as represented by the following Expression (1):

$$y(x)=h(x)*z(x) \qquad (1)$$

wherein y is the multiple image, z is the image before being superimposed (image to be restored to its original state), and h is a system function that generates the multiple image. Further, * represents a convolution operator. A double image is generated based on Expression (1).

The system function that generates the double image in Expression (1) takes such a form as represented by the following Expression (2):

$$h(x)=s\delta(x+x_0)+(1-s)\delta(x-x_0) \qquad (2)$$

wherein s is a transmissivity of an image, and $0<s\leq 0.5$ is set. Furthermore, $x_0$ is a value that is ½ of displacement between superimposed images, and $2x_0$ is a displacement amount between superimposed images. Moreover, δ is a delta function and defined by the following Expression (3):

$$\delta(x) = \begin{cases} 1 & \text{if } x=0 \\ 0 & \text{otherwise} \end{cases} \qquad (3)$$

The Fourier transformation of this system function is as represented by the following Expression (4):

$$H(u) = s\exp(j2\pi 2\pi_0) + (1-s)\exp(-j2\pi 2\pi_0) \qquad (4)$$
$$= \cos 2\pi o s_0 + j(2s-1)\sin 2\pi i n_0$$

Additionally, when an absolute value of this Fourier transformation is taken, the following Expression (5) can be obtained:

$$|H(u)| = (\cos^2 2\pi\pi u_0 + (2s-1)^2\sin^2 2\pi\pi u_0)^{\frac{1}{2}} \qquad (5)$$
$$= (1+4s(s-1)\sin^2 2\pi\pi u_0)^{\frac{1}{2}}$$

The Fourier transformation of Expression (1) is represented by the following Expression (6), and its absolute value is represented by the following Expression (7):

$$Y(u)=H(u)Z(u) \qquad (6)$$

$$|Y(u)|=|H(u)||Z(u)| \qquad (7)$$

Figure 4:
FIG. 4 is a view showing an example of a multiple image.
Figure 5:
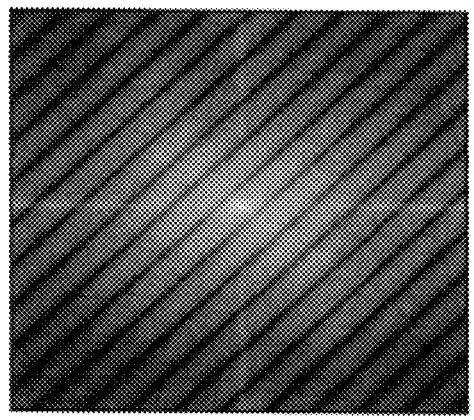
FIG. 5 is a view showing an absolute value of a frequency-transformed image obtained by subjecting the multiple image in FIG. 4 to the two-dimensional Fourier transformation.

For example, FIG. 5 shows an absolute value of the Fourier transformation of such a multiple image as depicted in FIG. 4. Based on Expression (7), an absolute value |Y(u)| of the Fourier transformation of a multiple image is a product of an absolute value |Z(u)| of the Fourier transformation of an image before turned to a multiple image and an absolute value |H(u)| of the Fourier transformation of a system function that generates a multiple image.

That is, measuring the absolute value |Y(u)| of the Fourier transformation of the multiple image enables grasping characteristics of the absolute value |H(u)| of the Fourier transformation of the system function. As a result, a displacement amount between images forming superimposed images can be measured by specifying the parameter $x_0$ included in the absolute value |H(u)| of the Fourier transformation of the system function.

There are roughly two methods of detecting a displacement amount between images by measuring the absolute value |Y(u)| of the Fourier transformation of the multiple image.

Figure 6:
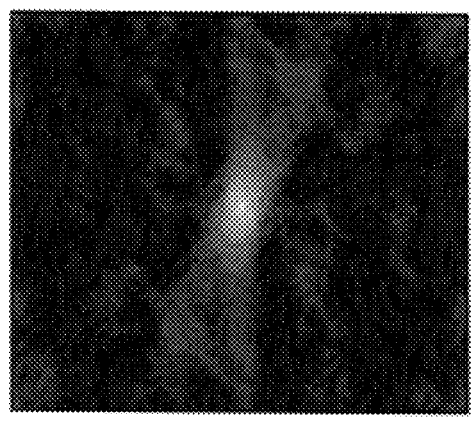
FIG. 6 is a view showing a processing result obtained by further subjecting the absolute value of the frequency-transformed image in FIG. 5 to the two-dimensional Fourier transformation.
Figure 7:
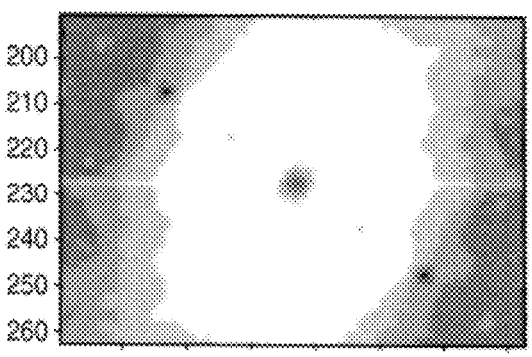
FIG. 7 is an enlarged view of a peak part in FIG. 6.

According to one method, the absolute value |Y(u)| of the Fourier transformation of the multiple image is further subjected to frequency transformation to check characteristics of a sinusoidal wave included in the absolute value |H(u)| of the Fourier transformation of the system function. The absolute value |H(u)| of the Fourier transformation of the system function is characterized by the sinusoidal wave. Therefore, for example, when the Fourier transformation is further performed with respect to the absolute value |Y(u)| of the Fourier transformation of the multiple image, a frequency of the sinusoidal wave included in the absolute value |H(u)| of the Fourier transformation of the system function is detected as a peak value. FIG. 6 shows this detection, and FIG. 7 is an enlarged view of this peak part. When this peak value is sought, a frequency of the sinusoidal wave included in the absolute value |H(u)| of the Fourier transformation of the system function is detected, and a displacement amount between images forming superimposed images included in the multiple image can be detected.

The other method is a technique of checking a cyclic structure of the sinusoidal wave included in the absolute value |Y(u)| of the Fourier transformation of the multiple image. For example, to check a cyclic structure of the sinusoidal wave, performing processing, e.g., measurement of a distance between minimal values can suffice. For example, as shown in FIG. 5, when a stripe pattern inherent to the absolute value of the Fourier transformation of the multiple image appears, a distance between minimal values of this stripe pattern represents a cycle of the cyclic structure of the absolute value |H(u)| of the Fourier transformation of the system function. Thus, detecting a distance between minimal values of this stripe pattern enables detecting a displacement amount between images forming superimposed images.

Measurement processing for a displacement amount between images forming superimposed images will be explained along the structure depicted in FIG. 2.

A multiple image recorded/held in the recording unit 103 is transmitted to the filtering unit 104. The filtering unit 104 performs filtering processing with respect to the transmitted multiple image. As the filtering processing in this filtering unit 104, low-pass filter processing that reduces an influence of noise at the time of measuring displacement between superimposed images, high-pass filter processing that improves a measurement accuracy at the time of measuring a displacement amount between images, or a band-pass filter processing obtained by combining both these types of filter processing may be used. Processing, e.g., smoothing filtering or Gaussian filtering is used as the low-pass filter processing, and differential filtering, secondary differential filtering, or Laplacian filtering is used as the high-pass filter processing. Specifically, Gaussian filtering as one type of low-pass filter processing is once carried out, and then Laplacian filtering as one type of high-pass filter processing is effected, for example.

It should be noted that the filtering processing in this filtering unit 104 can be omitted, and a multiple image may be directly transmitted to the frequency transformation unit 105 without performing the filtering processing.

The multiple mage subjected to the filtering processing in the filtering unit 104 is transmitted to the frequency transformation unit 105. In this frequency transformation unit 105, the multiple image is subjected to frequency transformation. Here, for example, two-dimensional fast Fourier transformation (FFT) processing for an image is executed. As another method, when a direction of displacement between images forming superimposed images included in the multiple image is already known, one-dimensional frequency transformation processing along this direction of displacement between images may be executed. Specifically, the one-dimensional Fourier transformation may be performed along a direction of displacement between images in the multiple image may be carried out. For example, in case of a multiple image acquired in such a structure where a double image reflected on a transparent plate is acquired as disclosed in Jpn. Pat. Appln. KOKAI Publication No. 2006-329897, a direction of displacement between images can be acquired in advance by an optical calibration method. Therefore, the previously acquired direction of displacement between images may be written in header information of the multiple image in advance, and this header information may be utilized to one-dimensionally execute the Fourier transformation. Further, when a direction of displacement between images in the multiple image is unknown, executing the Fourier transformation in two-dimensional space (i.e., the two-dimensional Fourier transformation) can suffice.

FIG. 4 is a view showing an example of the multiple image, and FIG. 5 is a view showing an example of the two-dimensional Fourier transformation for this multiple image. It should be noted that a two-dimensional Fourier transformation value is represented by an absolute value in FIG. 5. Furthermore, superimposed images depicted in FIG. 4 are shifted by 10 [pixels] in a horizontal direction and 20 [pixels] in a vertical direction to be turned to the multiple image. At this time, a stripe pattern appears in a direction of a vector [10, 20] in the Fourier transformation of the multiple image. In one-dimensional search processing, the one-dimensional Fourier transformation is performed along this direction, all Fourier transformation results in an axis perpendicular to an axis along which the Fourier transformation is effected are added, and results are averaged to obtain a final Fourier transformation result.

Here, as can be seen in FIG. 5, a frequency component derived from a subject itself generally tends to be concentrated in a low-frequency component domain (the center in FIG. 5) as a phenomenon inherent to a case where frequency transformation of a multiple image is performed. It can be understood that a frequency component derived from a system function that generates a multiple image is present in the entire frequency domain (a stripe pattern spreading in an entire image depicted in FIG. 5) with respect to such image characteristics. To evaluate the frequency component derived from the system function that generates the multiple image by priority while paying attention to this difference in characteristics, a high-frequency component in FIG. 5 may be further emphasized to be evaluated. For example, so-called high-pass filtering processing of reducing a value of a low-frequency domain in FIG. 5 and amplifying a value of a high-frequency component may be executed in the frequency domain. Moreover, although this processing has been explained in regard to the two-dimensional frequency domain with reference to FIG. 5, a high-frequency component may be likewise used by priority in a one-dimensional frequency domain.

An explanation will be proceeded while restricting the Fourier transformation to the two dimensions. The Fourier transformation in the one dimension can be readily realized by reducing the dimension.

The multiple image subjected to frequency transformation in the frequency transformation unit 105 is transmitted to the inter-superimposed-image displacement acquisition unit 106. The inter-superimposed-image displacement acquisition unit 106 calculates a displacement amount between images forming superimposed images from the transmitted frequency-transformed image subjected to this frequency transformation.

Figure 8:
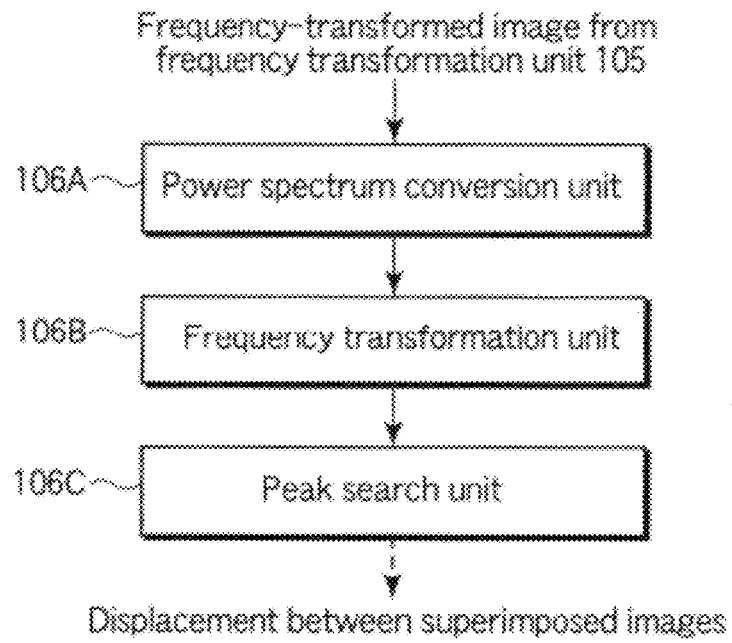
FIG. 8 is a view showing a structural example of an inter-superimposed-image displacement acquisition unit in FIG. 2.
Figure 9:
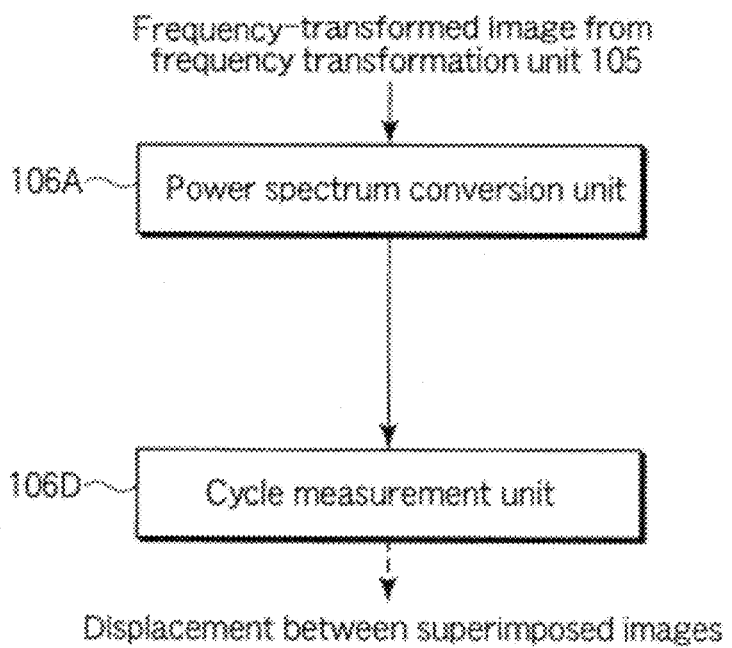
FIG. 9 is a view showing another structural example of the inter-superimposed-image displacement acquisition unit in FIG. 2.

Two types of structures of the inter-superimposed-image displacement acquisition unit 106 can be considered as shown in FIGS. 8 and 9, any one of the structures can be used.

That is, as shown in FIG. 8, the inter-superimposed-image displacement acquisition unit 106 can be constituted of a power spectrum conversion unit 106A, a frequency transformation unit 106B, and a peak search unit 106C. In case of such a structure, the frequency-transformed image transmitted from the frequency transformation unit 105 is supplied to the power spectrum conversion unit 106A. The power spectrum conversion unit 106A calculates a power spectrum value from the frequency-transformed image. This power spectrum value may be converted into an absolute value by performing root calculation. Here, it is assumed that the power spectrum value is converted into an absolute value. A processing result obtained from absolute value calculation in the power spectrum conversion unit 106A is again subjected to frequency transformation in the frequency transformation unit 106B. FIG. 6 is a view showing a processing result obtained by further performing the two-dimensional Fourier transformation with respect to the absolute value of the frequency-transformed image. It can be understood that a parameter of a cyclic structure of a stripe pattern inherent to the multiple image appears as a second peak in the image obtained after frequency transformation.

A peak in the frequency-transformed image again subjected to frequency transformation in the frequency transformation unit 106B is sought in the peak search unit 106C. Here, a second peak as a peak following the first peak that appears in a part having a frequency of zero is searched. A displacement amount $2x_0$ between images forming superimposed images is obtained from a correspondence of a search position for this second peak and a system function that generates the multiple image in Expression (5). That is, the inter-superimposed-image displacement acquisition unit 106 has a function of converting a distance between a position where a first peak value is produced and a position where a second peak value is produced into a displacement amount between images. Specifically, a distance between the peak value producing positions is represented in a frequency domain space, thereby providing a displacement amount between images (without changing a value) while a unit alone is changed into a pixel number.

Additionally, as shown in FIG. 9, the inter-superimposed-image displacement acquisition unit 106 can be constituted of a power spectrum conversion unit 106A and a cycle measurement unit 106D. In this case, the frequency-transformed image transmitted from the frequency transformation unit 105 is supplied to the power spectrum conversion unit 106A, and a power spectrum value is calculated. This power spectrum value may be converted into an absolute value by performing root calculation. Here, it is assumed that the power spectrum value is converted into an absolute value. A processing result obtained from absolute value calculation in the power spectrum conversion unit 106A is subjected to cycle measurement in the cycle measurement unit 106D. Here, when, e.g., a stripe pattern inherent to the frequency-transformed image in the multiple image appears as shown in FIG. 5, a cycle of the stripe pattern is measured by measuring a distance between minimal values in this stripe pattern. A displacement amount $2x_0$ between images forming superimposed images is obtained from a correspondence of a cycle value of this stripe pattern and a system function that generates the multiple image in Expression (5). That is, the inter-superimposed-image displacement acquisition unit 106 has a function of converting a waveform specified by a power spectrum of the frequency-transformed image, e.g., a length of one cycle of a sinusoidal wave into a displacement amount between images. Specifically, a cycle T as an inverse number of a frequency f of a sinusoidal wave obtained from Expression (5) is determined as a displacement amount between images. Here, if this cycle T is represented in a second space, a displacement amount between images is provided (without changing a value) while a unit alone is changed into a pixel number.

The displacement amount between images that form superimposed images calculated in the inter-superimposed-image displacement acquisition unit 106 in this manner is transmitted to the focusing control unit 107 and the output unit 109.

The displacement amount between images transmitted to the focusing control unit 107 is converted into a subject distance amount based on a correspondence relationship between a displacement amount between images held in the focusing control unit 107 and a subject distance. As the correspondence relationship, a relationship between an inter-image deformation amount and a subject distance is obtained based on calibration in advance, and this relationship is written in a lookup table in the focusing control unit 107, for example. Based on the obtained subject distance amount, the focusing control unit 107 controls the AF motor 108 so that the image acquisition optical system 100 can focus on the subject.

Further, the displacement amount between images forming superimposed images transmitted to the output unit 109 may be output to the outside through the output unit 109.

It should be noted that the above explanation has been given as to the example where displacement between superimposed images is single displacement, but a multiple image may be basically divided into partial images in accordance with respective parts, and the above-explained technique may be carried out on each partial image. When a multiple image is divided into a plurality of partial images and a displacement amount between images forming superimposed images included in each partial images is measured, the displacement amount between images can be excellently measured even though the superimposed images have complicated motions.

A method of performing measurement processing for a displacement amount between images with a multiple image being divided into partial images in this manner will be explained. In this case, two types of methods can be considered depending on the structure depicted in FIG. 8 or the structure depicted in FIG. 9 adopted as the inter-superimposed-image displacement acquisition unit 106.

First, a measurement processing method for a displacement amount between images when using the inter-superimposed-image displacement acquisition unit 106 having the structure depicted in FIG. 8 will be explained with reference to FIG. 10.

That is, the filtering unit 104 first reads the multiple image recorded in the recording unit 103 (step S1). At this time, if header information of the multiple image includes information of a direction of displacement between images or the like, the header information is read to be utilized in following steps S3 and S4.

Then, the filtering unit 104 specifies a partial image region in the multiple image read in step S1 (step S2). Here, the partial image region may take an arbitrary size of a region smaller than the multiple image. Here, a region of, e.g., 100× 100 [pixels] is used.

Further, the filtering unit 104 executes filtering processing with respect to the partial region in the multiple image specified in step S2 (step S3). As this filtering processing, low-pass filter processing intended to eliminate noise in the image, high-pass filter processing intended to realize a high accuracy of estimation of a displacement amount between images forming superimposed images, or both these types of processing may be used. It should be noted that the filtering processing at this step S3 may be omitted. Furthermore, two-dimensional filtering may be effected as this filtering processing. However, if the header information of the multiple image includes information of a direction of displacement between images, one-dimensional filtering processing along this direction may be executed as another method.

Subsequently, the frequency transformation unit 105 performs frequency transformation of the partial region in the multiple image subjected to the filtering processing (step S4) As this frequency transformation processing, Fourier transformation processing may be executed. Two-dimensional frequency transformation processing may be effected as the frequency transformation processing. However, if the header information of the multiple image includes information of a direction of displacement between images, one-dimensional frequency transformation along this direction may be carried out as another method. When the one-dimensional frequency transformation processing is performed, a single one-dimensional frequency transformation processing result is obtained by adding calculation results with respect to a direction perpendicular to a direction along which the frequency transformation is carried out. After the one-dimensional frequency transformation processing is effected, the one-dimensional frequency transformation processing is also effected at a later-explained step S6.

Then, the power spectrum conversion unit 106A of the inter-superimposed-image displacement acquisition unit 106 performs power spectrum conversion with respect to the frequency-transformed image subjected to the frequency transformation processing in step S4 (step S5). As the power spectrum conversion processing here, root calculation is further performed, and conversion into an absolute value can be also carried out. In this example, conversion into an absolute value is executed.

Thereafter, the frequency transformation unit 106B in the inter-superimposed-image displacement acquisition unit 106 further performs the frequency transformation processing with respect to an operation result obtained from the power spectrum (absolute value) conversion in step S5 (step S6). As the frequency transformation processing here, two-dimensional frequency transformation or one-dimensional frequency transformation is performed when the frequency transformation processing in step S4 is the two-dimensional frequency transformation. FIG. 6 is a view showing an example where the two-dimensional frequency transformation is effected in step S6. When performing the one-dimensional frequency transformation in step S6, operation results obtained from the two-dimensional frequency transformation in step S4 are averaged in a direction perpendicular to a direction of displacement between superimposed images to be turned to a one-dimensional frequency transformation result, and the one-dimensional frequency transformation processing is performed with respect to this one-dimensional frequency transformation result. Further, when the frequency transformation processing in step S4 is one-dimensional frequency transformation, the one-dimensional frequency transformation processing is likewise performed in step S6.

Furthermore, the peak search unit 106C in the inter-superimposed-image displacement acquisition unit 106 carries out power spectrum conversion with respect to the result obtained from the frequency transformation in step S6, and then searches for a peak of this processing result (step S7). Two-dimensional search processing is performed when the two-dimensional frequency transformation is effected in step S6, and one-dimensional search processing is performed when the one-dimensional frequency transformation is effected at the same. Here, peak search is performed in a part excluding a zero frequency, an intrinsic frequency peak value included in the multiple image is specified from this peak value, and a displacement amount between images is specified from this frequency (see the above explanation of the principle and Expression (5)).

Then, the filtering unit 104 judges whether the displacement amount between images has been specified in the entire region of the multiple image (step S8). Here, when specifying the displacement in the entire region is not completed, the partial image region is changed (step S9), and the control returns to step S2.

Moreover, when specifying displacement in the entire region is completed, the inter-superimposed-image displacement acquisition unit 106 outputs all of information of displacement amounts between images in the respective partial images specified in steps S1 to S9 to the focusing control unit 107 and the output unit 109 (step S10), thereby terminating the processing.

Figure 11:
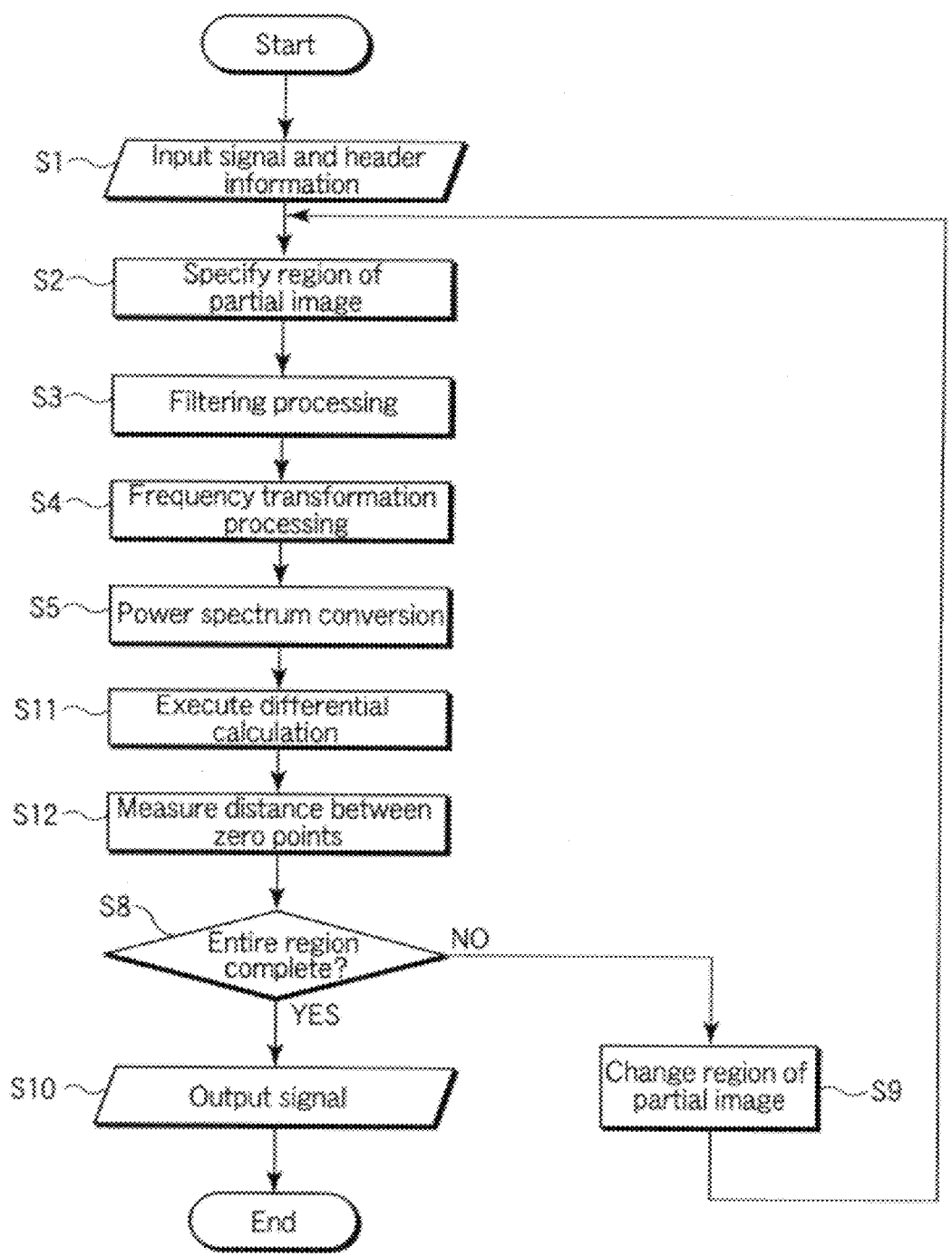
FIG. 11 is a view showing a flowchart for explaining a method of performing measurement processing for a displacement amount between images with a multiple image being divided into partial images when the structure depicted in FIG. 9 is used.

A measurement processing method for a displacement amount between images when using the inter-superimposed-image displacement acquisition unit 106 having the structure depicted in FIG. 9 will be explained with reference to FIG. 11.

That is, the filtering unit 104 first reads the multiple image recorded in the recording unit 103 (step S1). At this time, if header information of the multiple image includes information of a direction of displacement between images or the like, the header information is read to be utilized following steps S3 and S4.

Then, the filtering unit 104 specifies a partial image region in the multiple image read in step S1 (step S2). Here, the partial image region may take an arbitrary size of a region smaller than the multiple image. Here, a region of, e.g., 100× 100 [pixels] is used.

Moreover, the filtering unit 104 carries out filtering processing with respect to the partial region in the multiple image specified in step S2 (step S3). As this filtering processing, low-pass filter processing intended to eliminate noise in the image, high-pass filter processing intended to realize a high accuracy of estimation of a displacement amount between images forming superimposed images, or both these types of processing may be used. It should be noted that the filtering processing at this step S3 may be omitted. Furthermore, two-dimensional filtering may be effected as this filtering processing. However, if the header information of the multiple image includes information of a direction of displacement between images, one-dimensional filtering processing along this direction may be executed as another method.

Subsequently, the frequency transformation unit 105 performs frequency transformation of the partial region in the multiple image subjected to the filtering processing (step S4). As this frequency transformation processing, Fourier transformation processing may be executed. Two-dimensional frequency transformation processing may be effected as the frequency transformation processing. However, if the header information of the multiple image includes information of a direction of displacement between images, one-dimensional frequency transformation along this direction may be carried out as another method. When the one-dimensional frequency transformation processing is performed, a single one-dimensional frequency transformation processing result is obtained by adding calculation results with respect to a direction perpendicular to a direction along which the frequency transformation is carried out. After the one-dimensional frequency transformation processing is effected, the one-dimensional frequency transformation processing is also effected at a later-explained step S6.

Then, the power spectrum conversion unit 106A of the inter-superimposed-image displacement acquisition unit 106 performs power spectrum conversion with respect to the frequency-transformed image subjected to the frequency transformation processing in step S4 (step S5). As the power spectrum conversion processing here, root calculation is further performed, and conversion into an absolute value can be also carried out. In this example, conversion into an absolute value is executed.

The cycle measurement unit 106D in the inter-superimposed-image displacement acquisition unit 106 performs image differential processing with respect to an operation result obtained from the power spectrum (absolute value) conversion in step S5 (step S11). As this differential processing, differential processing based on two-dimensional filtering may be carried out. However, when the header information of the multiple image includes information of a direction of displacement between images, differential processing based on one-dimensional filtering along this direction may be executed as another method. When the differential processing based on the one-dimensional filtering is performed, a single differential processing result is obtained by adding calculation results with respect to a direction perpendicular to a direction along which the differential processing is effected.

Additionally, the cycle measurement unit 106D further measures a distance between zero points as a differential processing result with respect to a result of effecting the differential processing in step S6 (step S12). In reality, zero points cannot be obtained because of an influence of, e.g., noise in some cases. However, it is possible to search for a distance between minimal values in such a case. This distance between zero points is a cycle of a stripe pattern intrinsically included in the multiple image. An intrinsic frequency included in the multiple image is specified from this cycle, and a displacement amount between images is specified from this frequency (see the above explanation of the principle and Expression (5)).

Then, the filtering unit 104 judges whether the displacement amount between images has been specified in the entire region of the multiple image (step S8). Here, when specifying the displacement amount in the entire region is not completed, the partial image region is changed (step S9), and the control returns to step S2.

Moreover, when specifying the displacement amount in the entire region is completed, the inter-superimposed-image displacement acquisition unit 106 outputs all of information of displacement amounts between images in the respective partial images specified in steps S1 to S9 to the focusing control unit 107 and the output unit 109 (step S10), thereby terminating the processing.

As explained above, according to the first embodiment, for example, even when a multiple image is acquired by the image acquisition apparatus, a displacement amount between images forming superimposed images is measured, and a distance to a subject is measured by using this result like Jpn. Pat. Appln. KOKAI Publication No. 2006-329897 or Jpn. Pat. Appln. KOKAI Publication No. 7-135597, measuring displacement between images based on frequency transformation processing enables highly accurately measuring a displacement amount between images. That is because characteristics that the multiple image intrinsically has, e.g., a peak value of a frequency can be remarkably detected by using frequency transformation. Therefore, as a result, a distance to the subject can be highly accurately measured.

Second Embodiment

As shown in FIG. 12, an image acquisition apparatus according to a second embodiment of the present invention includes an input unit 200, a recording unit 201, a filtering unit 202, a frequency transformation unit 203, an inter-superimposed-image displacement acquisition unit 204, an output unit 205, a control unit 206, and an external interface unit 207. It should be noted that an arrow of a solid thick line represents a flow of a picture signal, an arrow of a solid thin line represents a flow of a control signal, and an arrow of a broken line represents a flow of any other signal in FIG. 12, respectively.

The input unit 200 performs image input processing. The recording unit 201 is the same as the recording unit 103 in the first embodiment. The filtering unit 202 is the same as the filtering unit 104 in the first embodiment. The frequency transformation unit 203 is the same as the frequency transformation unit 105 in the first embodiment. The inter-superimposed-image displacement acquisition unit 204 is the same as the inter-superimposed-image displacement acquisition unit 106 in the first embodiment. The output unit 205 is the same as the output unit 109 in the first embodiment. The control unit 206 is the control unit 110 in the first embodiment. The external interface unit 207 is the same as the external interface unit 111 in the first embodiment.

Operations of the respective units in such a structure will be explained hereinafter in detail.

A multiple image input by the input unit 200 is recorded in the recording unit 201. As the image input by this input unit 200, an arbitrary image can be input, and the present invention is not restricted to the multiple image. Even when an image other than a multiple image is input, it can be recorded in the recording unit 201, and then subjected to output processing in the output unit 205. In case of a multiple image, a displacement amount between images forming superimposed images included in the multiple image is measured through the filtering unit 202, the frequency transformation unit 203, and the inter-superimposed-unit displacement acquisition unit 204.

Here, the multiple image represents general images in which images of a subject are superimposed on each other. Specifically, it represents: an image acquired when an image acquisition apparatus forms images of a subject in a superimposed manner; a ghost image in which images of a subject are superimposed because of an electronic or an optical function; a flare image; an image in which images of a subject are multiply-layered because of a failure in positioning processing when a plurality of images are positioned and superimposed on each other; and others.

The fundamental scheme of measurement utilizing displacement between images in a multiple image is as explained in the first embodiment.

Measurement processing for a displacement amount between images will be explained hereinafter along the structure depicted in FIG. 12.

A multiple image recorded/held in the recording unit 201 is transmitted to the filtering unit 202, and the filtering unit 202 performs filtering processing with respect to the transmitted multiple image. As the filtering processing in this filtering unit 202, low-pass filter processing that reduces an influence of noise at the time of measuring a displacement amount between images, high-pass filter processing that improves a measurement accuracy at the time of measuring a displacement amount between images, or a band-pass filter processing obtained by combining both these types of filter processing may be used. Processing, e.g., smoothing filtering or Gaussian filtering is used as the low-pass filter processing, and differential filtering, a secondary differential filtering, or Laplacian filtering is used as the high-pass filter processing. Specifically, Gaussian filtering as one type of low-pass filter processing is once carried out, and then Laplacian filtering as one type of high-pass filter processing is effected, for example.

It should be noted that, the filtering in this filtering unit 202 can be omitted, and a multiple image may be directly transmitted to the frequency transformation unit 203 without performing the filtering.

The multiple image subjected to the filtering in the filtering unit 202 is transmitted to the frequency transformation unit 203. In this frequency transformation unit 203, the multiple image is subjected to frequency transformation. Here, for example, two-dimensional FFT processing for an image is executed. As another method, when a direction of displacement between images forming superimposed images included in the multiple image is already known, one-dimensional frequency transformation processing along this direction of displacement between images may be executed. Specifically, the one-dimensional Fourier transformation may be performed along a direction of displacement between images in the multiple image may be carried out. For example, in case of a multiple image acquired in such a structure where a double image reflected on a transparent plate is acquired as disclosed in Jpn. Pat. Appln. KOKAI Publication No. 2006-329897, a direction of displacement between images can be acquired in advance by an optical calibration method. Therefore, the previously acquired displacement between images may be written in header information of the multiple image in advance, and this header information may be utilized to one-dimensionally execute the Fourier transformation. Further, when a direction of displacement between images in the multiple image is unknown, executing the Fourier transformation in a two-dimensional space (i.e., the two-dimensional Fourier transformation) can suffice.

For example, when such a multiple image as shown in FIG. 4 is subjected to the two-dimensional Fourier transformation, such as image as depicted in FIG. 5 can be obtained. It should be noted that a two-dimensional Fourier transformation value is represented by an absolute value in FIG. 5. Furthermore, superimposed images depicted in FIG. 4 are shifted by 10 [pixels] in a horizontal direction and 20 [pixels] in a vertical direction to be turned to the multiple image. At this time, a stripe pattern appears in a direction of a vector [10, 20] in the Fourier transformation of the multiple image. In one-dimensional search processing, the one-dimensional Fourier transformation is performed along this direction, all Fourier transformation results in an axis perpendicular to an axis along which the Fourier transformation is effected are added, and results are averaged to obtain a final Fourier transformation result.

Here, as can be seen in FIG. 5, a frequency component derived from a subject itself generally tends to be concentrated in a low-frequency component domain (the center in FIG. 5) as a phenomenon inherent to a case where frequency transformation of a multiple image is performed. It can be understood that a frequency component derived from a system function that generates a multiple image is present in the entire frequency domain (a stripe pattern spreading in an entire image depicted in FIG. 5) with respect to such image characteristics. To evaluate the frequency component derived from the system function that generates the multiple image by priority while paying attention to this difference in characteristics, a high-frequency component in FIG. 5 may be further emphasized to be evaluated. For example, so-called high-pass filtering processing of reducing a value of a low-frequency domain in FIG. 5 and amplifying a value of a high-frequency component may be executed in the frequency domain. Moreover, although this processing has been explained in regard to the two-dimensional frequency domain with reference to FIG. 5, a high-frequency component may be likewise used by priority in a one-dimensional frequency domain.

An explanation will be proceeded while restricting the Fourier transformation to the two dimensions. The Fourier transformation in the one dimension can be readily realized by reducing the dimension.

The multiple image subjected to frequency transformation in the frequency transformation unit 203 is transmitted to the inter-superimposed-image displacement acquisition unit 204. The inter-superimposed-image displacement acquisition unit 204 acquires a displacement amount between images from the frequency-transformed image subjected to this frequency transformation.

Two types of structures of the inter-superimposed-image displacement acquisition unit 204 can be considered as shown in FIGS. 8 and 9, and any one of the structures can be used. Particulars in the structures of the inter-superimposed-image displacement acquisition unit 204 are the same as those in the inter-superimposed-image displacement acquisition unit 106 in the first embodiment, thereby omitting an explanation thereof.

A displacement amount between images acquired by the inter-superimposed-image displacement acquisition unit 204 is transmitted to the output unit 205. This displacement amount between images transmitted to the output unit 205 may be output to the outside through the output unit 205.

It should be noted that the above explanation has been given as to the example where displacement between images forming superimposed images is single displacement, but a multiple image may be basically divided into partial images in accordance with respective parts, and the above-explained technique may be carried out on each partial image. When a multiple image is divided into a plurality of partial images and a displacement amount between images forming superimposed images included in each partial image is measured, the displacement amount between images can be excellently measured even though the superimposed images have complicated motions.

A method of performing measurement processing for a displacement amount between images with a multiple image being divided into partial images in this manner will be explained.

An example where the structure depicted in FIG. 8 is used as the inter-superimposed-image displacement acquisition unit 204 will be first explained with reference to the flowchart of FIG. 10.

That is, the filtering unit 202 first reads the multiple image input from the input unit 200 and recorded/held in the recording unit 201 (step S1). At this time, if header information of the multiple image includes information of a direction of displacement between images or the like, the header information is read to be utilized following steps S3 and S4.

Then, the filtering unit 202 specifies a partial image region in the multiple image read in step S1 (step S2). Here, the partial image region may take an arbitrary size of a region smaller than the multiple image. Here, a region of, e.g., 100× 100 [pixels] is used.

Further, the filtering unit 202 executes filtering processing with respect to the partial region in the multiple image specified in step S2 (step S3). As this filtering processing, low-pass filter processing intended to eliminate noise in the image, high-pass filter processing intended to realize a high accuracy of estimation of a displacement amount between images forming superimposed images, or both these types of processing may be used. It should be noted that the filtering processing at this step S3 may be omitted. Furthermore, two-dimensional filtering may be effected as this filtering processing. However, if the header information of the multiple image includes information of a direction of displacement between images, one-dimensional filtering processing along this direction may be executed as another method.

Subsequently, the frequency transformation unit 203 performs frequency transformation of the partial region in the multiple image subjected to the filtering processing (step S4). As this frequency transformation processing, Fourier transformation processing may be executed. Two-dimensional frequency transformation processing may be effected as the frequency transformation processing. However, if the header information of the multiple image includes information of a direction of displacement between images, one-dimensional frequency transformation along this direction may be carried out as another method. When the one-dimensional frequency transformation processing is performed, a single one-dimensional frequency transformation processing result is obtained by adding calculation results with respect to a direction perpendicular to a direction along which the frequency transformation is carried out. After the one-dimensional frequency transformation processing is effected, the one-dimensional frequency transformation processing is also effected at a later-explained step S6.

Then, the inter-superimposed-image displacement acquisition unit 204 performs power spectrum conversion with respect to the frequency-transformed image subjected to the frequency transformation processing in step S4 (step S5). As the power spectrum conversion processing here, root calculation is further performed, and conversion into an absolute value can be also carried out. In this example, conversion into an absolute value is executed.

Thereafter, the inter-superimposed-image displacement acquisition unit 204 further performs the frequency transformation processing with respect to an operation result obtained from the power spectrum (absolute value) conversion in step S5 (step S6). As the frequency transformation processing here, two-dimensional frequency transformation or one-dimensional frequency transformation is performed when the frequency transformation processing in step S4 is the two-dimensional frequency transformation. FIG. 6 is a view showing an example where the two-dimensional frequency transformation is effected in step S6. When performing the one-dimensional frequency transformation in step S6, operation results obtained from the two-dimensional frequency transformation in step S4 are averaged in a direction perpendicular to a direction of displacement between superimposed images to be turned to a one-dimensional frequency transformation result, and the one-dimensional frequency transformation processing is performed with respect to this one-dimensional frequency transformation result. Further, when the frequency transformation processing in step S4 is one-dimensional frequency transformation, the one-dimensional frequency transformation processing is likewise performed in step S6.

Furthermore, the inter-superimposed-image displacement acquisition unit 204 carries out power spectrum conversion with respect to the result obtained from the frequency transformation in step S6, and then searches for a peak of this processing result (step S7). Two-dimensional search processing is performed when the two-dimensional frequency transformation is effected in step S6, and one-dimensional search processing is performed when the one-dimensional frequency transformation is effected at the same. Here, peak search is performed in a part excluding a zero frequency, an intrinsic frequency peak value included in the multiple image is specified, and a displacement amount between images is specified from this frequency (see the above explanation of the principle and Expression (5)).

Then, the filtering unit 202 judges whether the displacement amount between images has been specified in the entire region of the multiple image (step S8). Here, when specifying the displacement amount in the entire region is not completed, the partial image region is changed (step S9), and the control returns to step S2.

Moreover, when specifying displacement in the entire region is completed, the inter-superimposed-image displacement acquisition unit 204 outputs all of information of displacement amounts between images in the respective partial images specified in steps S1 to S9 to the output unit 109 (step S10), thereby terminating the processing.

An example where the structure depicted in FIG. 9 is used as the inter-superimposed-image displacement acquisition unit 204 will be explained with reference to the flowchart of FIG. 11.

That is, the filtering unit 202 first reads the multiple image input from the input unit 200 and recorded/held in the recording unit 201 (step S1). At this time, if header information of the multiple image includes information of a direction of displacement between images or the like, the header information is read to be utilized following steps S3 and S4.

Then, the filtering unit 202 specifies a partial image region in the multiple image read in step S1 (step S2). Here, the partial image region may take an arbitrary size of a region smaller than the multiple image. Here, a region of, e.g., 100× 100 [pixels] is used.

Further, the filtering unit 202 executes filtering processing with respect to the partial region in the multiple image specified in step S2 (step S3). As this filtering processing, low-pass filter processing intended to eliminate noise in the image, high-pass filter processing intended to realize a high accuracy of estimation of a displacement amount between images forming superimposed images, or both these types of processing may be used. It should be noted that the filtering processing at this step S3 may be omitted. Furthermore, two-dimensional filtering may be effected as this filtering processing. However, if the header information of the multiple image includes information of a direction of displacement between images, one-dimensional filtering processing along this direction may be executed as another method.

Subsequently, the frequency transformation unit 203 performs frequency transformation of the partial region in the multiple image subjected to the filtering processing (step S4). As this frequency transformation processing, Fourier transformation processing may be executed. Two-dimensional frequency transformation processing may be effected as the frequency transformation processing. However, if the header information of the multiple image includes information of a direction of displacement between images, one-dimensional frequency transformation along this direction may be carried out as another method. When the one-dimensional frequency transformation processing is performed, a single one-dimensional frequency transformation processing result is obtained by adding calculation results with respect to a direction perpendicular to a direction along which the frequency transformation is carried out. After the one-dimensional frequency transformation processing is effected, the one-dimensional frequency transformation processing is also effected at a later-explained step S6.

Then, the inter-superimposed-image displacement acquisition unit 204 performs power spectrum conversion with respect to the frequency-transformed image subjected to the frequency transformation processing in step S4 (step S5). As the power spectrum conversion processing here, root calculation is further performed, and conversion into an absolute value can be also carried out. In this example, conversion into an absolute value is executed.

The inter-superimposed-image displacement acquisition unit 204 performs image differential processing with respect to an operation result obtained from the power spectrum (absolute value) conversion in step S5 (step S11). As this differential processing, differential processing based on two-dimensional filtering may be carried out. However, when the header information of the multiple image includes information of a direction of displacement between images, differential processing based on one-dimensional filtering along this direction may be executed as another method. When the differential processing based on the one-dimensional filtering is performed, a single differential processing result is obtained by adding calculation results with respect to a direction perpendicular to a direction along which the differential processing is effected.

Additionally, the inter-superimposed-image displacement acquisition unit 204 further measures a distance between zero points as a differential processing result with respect to a result of effecting the differential processing in step S6 (step S12). In reality, zero points cannot be obtained because of an influence of, e.g., noise in some cases. However, it is possible to search for a distance between minimal values in such a case. This distance between zero points is a cycle of a stripe pattern intrinsically included in the multiple image. An intrinsic frequency included in the multiple image is specified from this cycle, and a displacement amount between images is specified from this frequency (see the above explanation of the principle and Expression (5)).

Then, the filtering unit 202 judges whether the displacement amount between images has been specified in the entire region of the multiple image (step S8). Here, when specifying the displacement amount in the entire region is not completed, the partial image region is changed (step S9), and the control returns to step S2.

Moreover, when specifying the displacement amount in the entire region is completed, the inter-superimposed-image displacement acquisition unit 204 outputs all of information of displacement amounts between images in the respective partial images specified in steps S1 to S9 to the output unit 205 (step S10), thereby terminating the processing.

As explained above, when the image processor is configured as a single element without being incorporated in the image acquisition apparatus like the first embodiment, it is possible to measure a displacement amount between images forming superimposed images included in a multiple image input from the outside, e.g., a multiple image acquired by an image acquisition apparatus that does not have the image processor.

Although the present invention has been explained based on the first and second embodiments, the present invention is not restricted to the foregoing embodiments, and various modifications or applications can be carried out within the scope of the present invention.

For example, when a program of software that realizes functions of the foregoing embodiments can be loaded into a computer, and this computer can execute this program to realize the functions.

Additionally, in the foregoing embodiments, a subject distance from an image acquiring position to a subject is measured based on a displacement amount between images forming superimposed images calculated by the inter-superimposed-image displacement calculation unit. As a modification, superimposed images included in a multiple image may be eliminated by using this displacement amount, and the multiple image including the superimposed images may be thereby restored to a restored image including no superimposed image. Specifically, a displacement amount between images forming superimposed images included in, e.g., a ghost image, a flare image, or an image unsuccessful in positioning is corrected by using a displacement amount calculated by the inter-superimposed-image displacement calculation unit, thereby generating a restored image from which a ghost or a flare is removed. According to this modification, since a displacement amount between superimposed images can be highly accurately measured, a highly accurate restored image can be consequently generated.

Further, in the foregoing embodiments, a cyclic structure of a sinusoidal wave represented by a power spectrum is measured. As a modification, if a waveform other than a sinusoidal wave, e.g., a rectangular wave or a triangular wave can be measured by using a power spectrum, a cyclic structure of this waveform may be measured.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processor comprising:
   an image input unit configured to input a multiple image including superimposed images, wherein the superimposed images comprise images of a subject which are superimposed on each other;
   a frequency transformation unit configured to perform frequency transformation processing with respect to the input multiple image; and
   an inter-superimposed-image displacement calculation unit configured to calculate a displacement amount between the images forming the superimposed images included in the input multiple image by using a frequency-transformed image subjected to the frequency transformation processing;
   wherein the inter-superimposed-image displacement calculation unit converts a length of one cycle of a waveform specified by a power spectrum of the frequency-transformed image into the displacement amount between the images; and
   wherein the inter-superimposed-image displacement calculation unit measures a cyclic structure of a sinusoidal wave represented by the power spectrum and converts a length of one cycle of the sinusoidal wave specified by the measured cyclic structure into the displacement amount between the images.

2. The image processor according to claim 1, wherein the inter-superimposed-image displacement calculation unit performs further frequency transformation processing with respect to the power spectrum of the frequency-transformed image and uses an occurrence position of a peak value of a frequency detected by using the power spectrum subjected to the further frequency transformation processing to calculate the displacement amount between the images.

3. The image processor according to claim 2, wherein the inter-superimposed-image displacement calculation unit converts a distance between an occurrence position of a first peak value and an occurrence position of a second peak value into the displacement amount between the images.

4. The image processor according to claim 1, wherein the frequency transformation unit performs frequency transformation processing utilizing a previously acquired direction of displacement between the images forming the superimposed images included in the multiple image as the frequency transformation processing.

5. The image processor according to claim 4, wherein the frequency transformation unit performs one-dimensional frequency transformation processing along the previously acquired direction of displacement between the images as the frequency transformation processing utilizing the direction of displacement.

6. The image processor according to claim 1, wherein the inter-superimposed-image displacement calculation unit amplifies a high-frequency component in the frequency-transformed image subjected to the frequency transformation processing to calculate the displacement amount between the images.

7. The image processor according to claim 1, wherein the frequency transformation processing is FFT processing.

8. The image processor according to claim 1, further comprising a focusing control unit configured to specify a subject distance from an image acquiring position to the subject based on the calculated displacement amount between the images.

9. The image processor according to claim 8, wherein the focusing control unit previously holds correspondence relationship information indicative of a correspondence relationship between the displacement amount between the images forming the superimposed images and the distance from the image acquiring position to the subject and specifies the subject distance based on the calculated displacement amount between the images and the correspondence relationship information.

10. The image processor according to claim 1, further comprising a filtering unit configured to perform filtering processing with respect to the input multiple image, wherein the filtering unit performs the filtering processing prior to the frequency transformation processing by the frequency transformation unit.

11. The image processor according to claim 10, wherein a filter used for the filtering processing is a high-pass filter.

12. An image acquisition apparatus comprising:
   an image acquisition optical system configured to form an image of a luminous flux of a subject;

a multiple image formation unit configured to form a multiple image of the subject in the image acquisition optical system;
an image signal generation unit configured to convert light from the image acquisition optical system into an electrical signal and generate an image signal from the converted electrical signal;
a frequency transformation unit configured to perform frequency transformation processing with respect to a multiple image which is generated by the image acquisition optical system, the multiple image formation unit and the image signal generation unit and includes superimposed images comprising at least two images which are superimposed on each other; and
an inter-superimposed-image displacement calculation unit configured to calculate a displacement amount between the images forming the superimposed images included in the input multiple image by using a frequency-transformed image subjected to the frequency transformation processing;
wherein the inter-superimposed-image displacement calculation unit converts a length of one cycle of a waveform specified by a power spectrum of the frequency-transformed image into the displacement amount between the images; and
wherein the inter-superimposed-image displacement calculation unit measures a cyclic structure of a sinusoidal wave represented by the power spectrum and converts a length of one cycle of the sinusoidal wave specified by the measured cyclic structure into the displacement amount between the images.

13. A non-transitory computer-readable storage medium storing an image processing program that is executable by a computer to perform functions comprising:
inputting a multiple image including superimposed images, wherein the superimposed images comprise images of a subject which are superimposed on each other;
performing frequency transformation processing with respect to the input multiple image; and
calculating a displacement amount between the images forming the superimposed images included in the input multiple image by using a frequency-transformed image subjected to the frequency transformation processing;
wherein, in the calculating, a length of one cycle of a waveform specified by a power spectrum of the frequency-transformed image is converted into the displacement amount between the images; and
wherein, in the calculating, a cyclic structure of a sinusoidal wave represented by the power spectrum is measured and a length of one cycle of the sinusoidal wave specified by the measured cyclic structure is converted into the displacement amount between the images.

14. An image processor comprising:
an image input unit configured to input a multiple image including superimposed images, wherein the superimposed images comprise images of a subject which are superimposed on each other;
a frequency transformation unit configured to perform frequency transformation processing with respect to the input multiple image; and
an inter-superimposed-image displacement calculation unit configured to calculate a displacement amount between the images forming the superimposed images included in the input multiple image by using a frequency-transformed image subjected to the frequency transformation processing;

wherein the frequency transformation unit performs frequency transformation processing utilizing a previously acquired direction of displacement between the images forming the superimposed images included in the multiple image as the frequency transformation processing.

15. The image processor according to claim 14, wherein the inter-superimposed-image displacement calculation unit performs further frequency transformation processing with respect to a power spectrum of the frequency-transformed image and uses an occurrence position of a peak value of a frequency detected by using the power spectrum subjected to the further frequency transformation processing to calculate the displacement amount between the images.

16. The image processor according to claim 15, wherein the inter-superimposed-image displacement calculation unit converts a distance between an occurrence position of a first peak value and an occurrence position of a second peak value into the displacement amount between the images.

17. The image processor according to claim 14, wherein the inter-superimposed-image displacement calculation unit converts a length of one cycle of a waveform specified by a power spectrum of the frequency-transformed image into the displacement amount between the images.

18. The image processor according to claim 17, wherein the inter-superimposed-image displacement calculation unit measures a cyclic structure of a sinusoidal wave represented by the power spectrum and converts a length of one cycle of the sinusoidal wave specified by the measured cyclic structure into the displacement amount between the images.

19. The image processor according to claim 14, wherein the frequency transformation unit performs one-dimensional frequency transformation processing along the previously acquired direction of displacement between the images as the frequency transformation processing utilizing the direction of displacement.

20. The image processor according to claim 14, wherein the inter-superimposed-image displacement calculation unit amplifies a high-frequency component in the frequency-transformed image subjected to the frequency transformation processing to calculate the displacement amount between the images.

21. The image processor according to claim 14, wherein the frequency transformation processing is FFT processing.

22. The image processor according to claim 14, further comprising a focusing control unit configured to specify a subject distance from an image acquiring position to the subject based on the calculated displacement amount between the images.

23. The image processor according to claim 22, wherein the focusing control unit previously holds correspondence relationship information indicative of a correspondence relationship between the displacement amount between the images forming the superimposed images and the distance from the image acquiring position to the subject and specifies the subject distance based on the calculated displacement amount between the images and the correspondence relationship information.

24. The image processor according to claim 14, further comprising a filtering unit configured to perform filtering processing with respect to the input multiple image, wherein the filtering unit performs the filtering processing prior to the frequency transformation processing by the frequency transformation unit.

25. The image processor according to claim 24, wherein a filter used for the filtering processing is a high-pass filter.

26. An image acquisition apparatus comprising:
an image acquisition optical system configured to form an image of a luminous flux of a subject;
a multiple image formation unit configured to form a multiple image of the subject in the image acquisition optical system;
an image signal generation unit configured to convert light from the image acquisition optical system into an electrical signal and generate an image signal from the converted electrical signal;
a frequency transformation unit configured to perform frequency transformation processing with respect to a multiple image which is generated by the image acquisition optical system, the multiple image formation unit and the image signal generation unit and includes superimposed images comprising at least two images which are superimposed on each other; and
an inter-superimposed-image displacement calculation unit configured to calculate a displacement amount between the images forming the superimposed images included in the input multiple image by using a frequency-transformed image subjected to the frequency transformation processing;
wherein the frequency transformation unit performs frequency transformation processing utilizing a previously acquired direction of displacement between the images forming the superimposed images included in the multiple image as the frequency transformation processing.

27. A non-transitory computer-readable storage medium storing an image processing program that is executable by a computer to perform functions comprising:
inputting a multiple image including superimposed images, wherein the superimposed images comprise images of a subject which are superimposed on each other;
performing frequency transformation processing with respect to the input multiple image; and
calculating a displacement amount between the images forming the superimposed images included in the input multiple image by using a frequency-transformed image subjected to the frequency transformation processing;
wherein, in the performing of the frequency transformation processing, frequency transformation processing utilizing a previously acquired direction of displacement between the images forming the superimposed images included in the multiple image is performed.

28. An image processor comprising:
an image input unit configured to input a multiple image including superimposed images, wherein the superimposed images comprise images of a subject which are superimposed on each other;
a frequency transformation unit configured to perform frequency transformation processing with respect to the input multiple image; and
an inter-superimposed-image displacement calculation unit configured to calculate a displacement amount between the images forming the superimposed images included in the input multiple image by using a frequency-transformed image subjected to the frequency transformation processing;
wherein the inter-superimposed-image displacement calculation unit amplifies a high-frequency component in the frequency-transformed image subjected to the frequency transformation processing to calculate the displacement amount between the images.

29. The image processor according to claim 28, wherein the inter-superimposed-image displacement calculation unit performs further frequency transformation processing with respect to a power spectrum of the frequency-transformed image and uses an occurrence position of a peak value of a frequency detected by using the power spectrum subjected to the further frequency transformation processing to calculate the displacement amount between the images.

30. The image processor according to claim 29, wherein the inter-superimposed-image displacement calculation unit converts a distance between an occurrence position of a first peak value and an occurrence position of a second peak value into the displacement amount between the images.

31. The image processor according to claim 28, wherein the inter-superimposed-image displacement calculation unit converts a length of one cycle of a waveform specified by the power spectrum of the frequency-transformed image into the displacement amount between the images.

32. The image processor according to claim 31, wherein the inter-superimposed-image displacement calculation unit measures a cyclic structure of a sinusoidal wave represented by the power spectrum and converts a length of one cycle of the sinusoidal wave specified by the measured cyclic structure into the displacement amount between the images.

33. The image processor according to claim 28, wherein the frequency transformation unit performs frequency transformation processing utilizing a previously acquired direction of displacement between the images forming the superimposed images included in the multiple image as the frequency transformation processing.

34. The image processor according to claim 33, wherein the frequency transformation unit performs one-dimensional frequency transformation processing along the previously acquired direction of displacement between the images as the frequency transformation processing utilizing the direction of displacement.

35. The image processor according to claim 28, wherein the frequency transformation processing is FFT processing.

36. The image processor according to claim 28, further comprising a focusing control unit configured to specify a subject distance from an image acquiring position to the subject based on the calculated displacement amount between the images.

37. The image processor according to claim 36, wherein the focusing control unit previously holds correspondence relationship information indicative of a correspondence relationship between the displacement amount between the images forming the superimposed images and the distance from the image acquiring position to the subject and specifies the subject distance based on the calculated displacement amount between the images and the correspondence relationship information.

38. The image processor according to claim 28, further comprising a filtering unit configured to perform filtering processing with respect to the input multiple image, wherein the filtering unit performs the filtering processing prior to the frequency transformation processing by the frequency transformation unit.

39. The image processor according to claim 38, wherein a filter used for the filtering processing is a high-pass filter.

40. An image acquisition apparatus comprising:
an image acquisition optical system configured to form an image of a luminous flux of a subject;
a multiple image formation unit configured to form a multiple image of the subject in the image acquisition optical system;

an image signal generation unit configured to convert light from the image acquisition optical system into an electrical signal and generate an image signal from the converted electrical signal;

a frequency transformation unit configured to perform frequency transformation processing with respect to a multiple image which is generated by the image acquisition optical system, the multiple image formation unit and the image signal generation unit and includes superimposed images comprising at least two images which are superimposed on each other; and an inter-superimposed-image displacement calculation unit configured to calculate a displacement amount between the images forming the superimposed images included in the input multiple image by using a frequency-transformed image subjected to the frequency transformation processing;

wherein the inter-superimposed-image displacement calculation unit amplifies a high-frequency component in the frequency-transformed image subjected to the frequency transformation processing to calculate the displacement amount between the images.

41. A non-transitory computer-readable storage medium storing an image processing program that is executable by a computer to perform functions comprising:

inputting a multiple image including superimposed images, wherein the superimposed images comprise images of a subject which are superimposed on each other;

performing frequency transformation processing with respect to the input multiple image; and calculating a displacement amount between the images forming the superimposed images included in the input multiple image by using a frequency-transformed image subjected to the frequency transformation processing;

wherein, in the calculating, a high-frequency component in the frequency-transformed image subjected to the frequency transformation processing is amplified, to calculate the displacement amount between the images.

* * * * *